No. 855,527. PATENTED JUNE 4, 1907.
C. G. OMAN.
LAWN MOWER.
APPLICATION FILED NOV. 28, 1905.
2 SHEETS—SHEET 2.
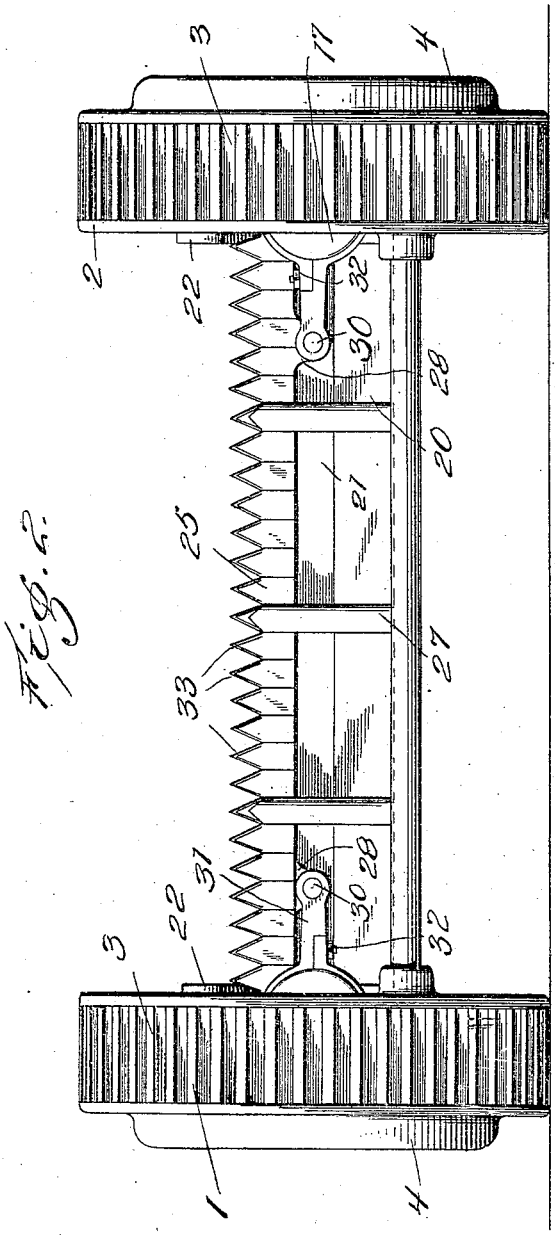
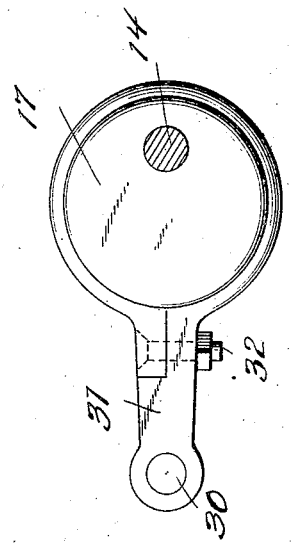
Witnesses
G. P. Thomas
F. C. Jones
Inventor
Charles G. Oman
By Chandler & Chandler
Attorneys

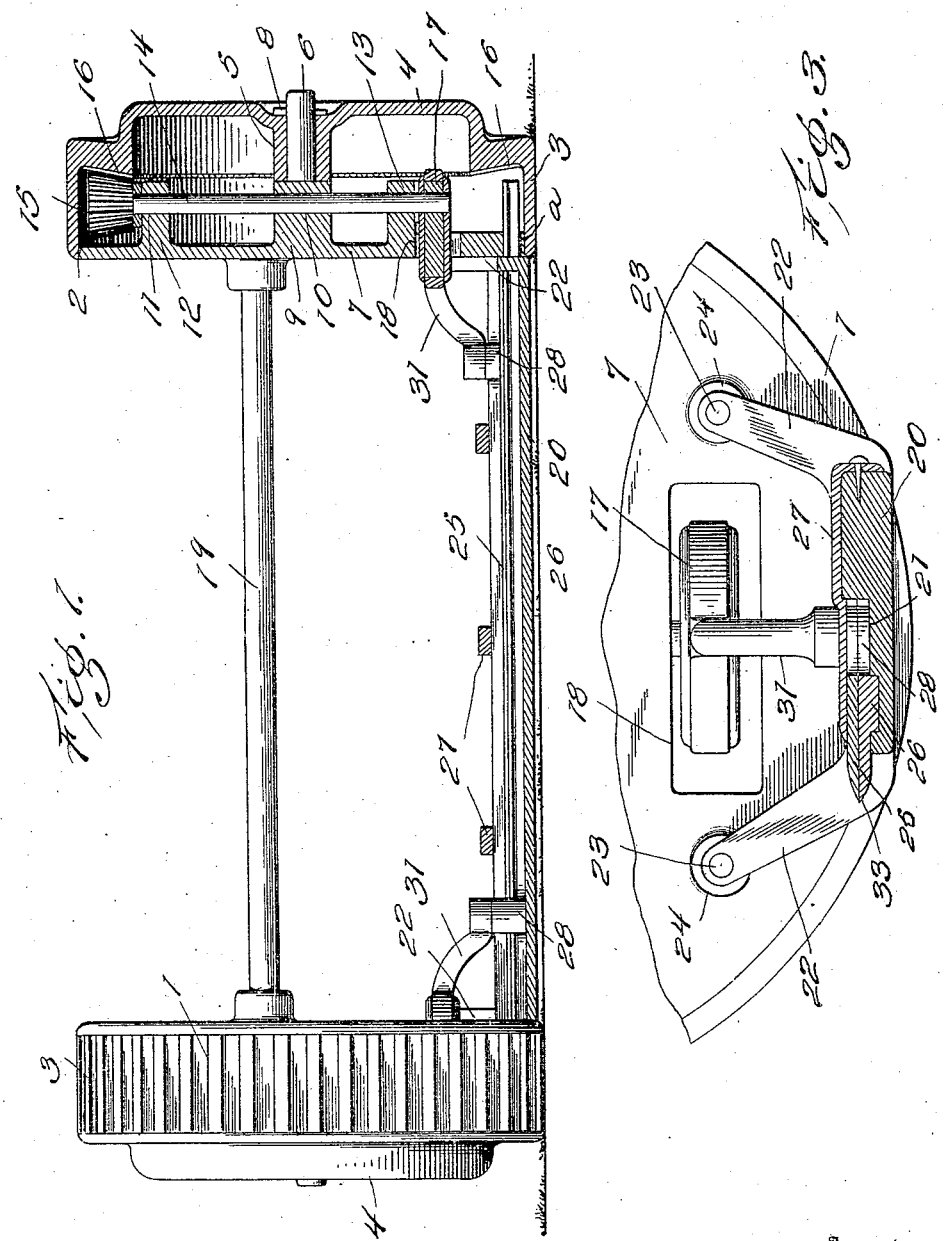

UNITED STATES PATENT OFFICE.

CHARLES G. OMAN, OF JONESBORO, INDIANA.

LAWN-MOWER.

No. 855,527.  Specification of Letters Patent.  Patented June 4, 1907.

Application filed November 28, 1905. Serial No. 289,393.

*To all whom it may concern:*

Be it known that I, CHARLES G. OMAN, a citizen of the United States, residing at Jonesboro, in the county of Grant, State of Indiana, have invented certain new and useful Improvements in Lawn-Mowers; and I do hereby declare the following to be a full, clear, and exact description of the invention, such as will enable others skilled in the art to which it appertains to make and use the same.

This invention relates to mowing machines.

One object is to provide a comparatively simple, inexpensive, durable, efficient and easily operated machine particularly designed for the cutting of lawn grass.

Another object resides in the provision of a hand mower embodying such characteristics that it will be light and positive in operation.

With these and other objects in view, the present invention consists in the combination and arrangement of parts as will be hereinafter more fully described, shown in the accompanying drawings and particularly pointed out in the appended claims.

In the drawings: Figure 1 is a rear view of a mower illustrating one of the ground wheels and other portions in section. Fig. 2 is a top plan view. Fig. 3 is a transverse sectional view through the cutter bar support and the overlapping cutter bars. Fig. 4 is a detail view of one of the eccentrics and the pitman mounted thereupon.

Referring now more particularly to the accompanying drawings, the reference characters 1 and 2 indicate ground wheels provided with a tread flange 3 and an outwardly extending bulging portion 4 within its periphery in the center of which bulging portion is disposed the inwardly directed bearing sleeve 5 designed to engage the stub shaft 6 of the disk 7 forming the inner side of each wheel and to permit of rotation of the ground wheels. A fastening pin 8 is designed to prevent accidental disengagement of the ground wheels from the respective stub shaft 6. It will be observed that the stub shafts 6 are formed by reducing the outer ends of a boss 9 formed upon the inner face of the disk 7 and that the enlarged portion of each boss is provided with a perforation 10 arranged in alinement with the perforation 11 in each of the upper and lower bosses 12 and 13 of the disk 7. These bosses 9, 12 and 13 have a shaft 14 rotatably mounted through their perforations. The upper end of each shaft 14 is provided with a pinion 15 designed to mesh with the circular toothed rack 16 formed upon the inner face of each ground wheel intermediate the tread surface 3 and the periphery of the bulging portion 4. The lower end of each shaft 14 has an eccentric 17 fixedly mounted thereupon beneath the lower boss 13 and this eccentric 17 is designed to operate inwardly and outwardly in the hollow formed by the wheel proper and the disk 7 through an opening 18. These disks 7 of the ground wheels are connected together by means of a suitable tie rod 19 so that the disks will remain stationary while the ground wheels revolve.

A cutter bar support 20 is mounted between the disks 7 of the ground wheels. It will be observed that this cutter bar support 20 has a groove 21 in its upper face extending longitudinally throughout its length and that each end of the cutter bar support 20 has a U-shaped bracket 22 extending at a right angle thereto so that the cutter support may be supported between the disk 7 by reason of suitable pins 23 passed through the legs of the brackets 22 and engaged in a pair of lugs 24 of each disk 7. The cutter bar 25 is mounted directly above the cutter bar 26 and it will be seen that these cutter bars co-operate with each other, and pass each other in opposite directions according to the movement imparted thereto in the manner hereinafter described.

The cutter bars 25 and 26 operate in a longitudinal groove 21 of the cutter bar support 20 and are held from displacement through the instrumentality of suitable clamps or plates 27 secured to the cutter bar support in any suitable manner and overlapping the rear edges of the cutter bars. Each cutter bar is provided with a lug 28 directed rearwardly thereof and provided with a perforation 29 for the engagement therein of a wrist pin 30 which passes also through the corresponding pitman 31 arranged at one end of each of the cutter bars and connected by means of a suitable bolt 32 to the corresponding aforesaid eccentrics 17. It will be seen that the cutter bars are connected to pitmen at opposite ends for engagement with the corresponding sprockets and that obviously when the eccentrics are operated the pitmen operate in such direction as to cause the overlapping cutter bars to operate in the opposite directions and thereby cut the grass through the overlapping of the toothed edges 33 of the cutter bars. It will also be seen that each cutter bar passes through a slot *a* of the corresponding disks 7 into close proximity with the circular racks of the corresponding ground wheels.

From the foregoing, it will be seen that my improved mowing machine is exceedingly simple in construction and that by reason of the disks and ground wheels being connected together in the manner stated, hollow ground wheels are provided to protect the operating mechanism arranged within the respective wheels.

What is claimed is:

A mowing machine comprising ground wheels each having a central inwardly directed integral bearing sleeve and an annular rack formed on its inner face; a disk carried by each ground wheel and provided with a vertical series of bosses formed on its inner face and having alining openings, the central boss of each disk having a reduced extended end adapted to be received in the bearing sleeve of the adjacent ground wheel, to serve as the axle for the latter; a vertically disposed shaft mounted in the openings of each series of bosses; a pinion secured to the upper end of each shaft for operative engagement with the adjacent rack; an eccentric secured to the lower end of each shaft, said eccentrics being oppositely disposed with respect to each other; a tie rod connecting said disks to hold the same stationary; a cutter-bar support disposed transversely between said disks and connected therewith, said support having a longitudinal slot formed therein; a pair of cutter bars mounted upon said support one above the other, each cutter bar having a lug at one end for engagement with the corresponding eccentric, whereby the cutter bars may be reciprocated in opposite directions upon rotation of the ground wheels; and clamps secured to said support and extending forwardly over the cutter bars, to prevent displacement of the latter.

In testimony whereof, I affix my signature, in presence of two witnesses.

CHARLES G. OMAN.

Witnesses:
 LORAN M. PEMBERTON,
 FRED SCHRADER.